United States Patent [19]

Hanada et al.

[11] 4,267,297

[45] May 12, 1981

[54] ROOM TEMPERATURE CURABLE SILICONE RESINS

[75] Inventors: Tsuneo Hanada; Ryuzo Mikami, both of Ichihara, Japan

[73] Assignee: Toray Silicone Company, Ltd., Tokyo, Japan

[21] Appl. No.: 86,559

[22] Filed: Oct. 19, 1979

[51] Int. Cl.³ .................. C08L 83/06; C08G 77/16; C08G 77/18
[52] U.S. Cl. .................. 528/18; 525/477; 528/32; 528/34
[58] Field of Search .................. 525/477; 528/34, 18

[56] References Cited

U.S. PATENT DOCUMENTS

| | | | |
|---|---|---|---|
| 3,607,801 | 9/1971 | Fulton | 525/477 |
| 3,676,420 | 7/1972 | Fulton et al. | 525/477 |

FOREIGN PATENT DOCUMENTS 1435636  5/1976  United Kingdom ............... 525/477

Primary Examiner—Wilbert J. Briggs, Sr.
Attorney, Agent, or Firm—Robert L. McKellar

[57] ABSTRACT

What is disclosed are room temperature curable silicone resins which have solvent, heat and weather resistance, mold release properties and water repellency in their cured state. Silicone resins are treated with alkoxylated siloxanes, alkoxysilanes and aminoalkoxysilanes to give these properties.

9 Claims, No Drawings

ROOM TEMPERATURE CURABLE SILICONE RESINS

BACKGROUND OF THE INVENTION

The present invention deals with silicone resin compositions which are curable at room temperature. More precisely, it deals with silicone resin compositions which can give a coating with excellent solvent resistance, mold release, water repellency, heat resistance, weather resistance and which have extended storage stability.

When organopolysiloxane resins containing hydroxyl groups bound to silicon atoms (hydroxylated silicone resins) are cured, traditional methods involve baking the resin at elevated temperatures. These temperatures are usually above 150° C. and occasionally reach temperatures above 200° C. Recently silicone resin compositions which are curable at room temperature has been proposed.

For example, room temperature curable resin compositions consisting of a hydroxylated silicone resin and an aminoalkylalkoxysilane, and of a hydroxylated silicone resin and an alkenylacetoxysilane were reported in U.S. Pat. No. 3,350,349 and U.S. Pat. No. 2,615,861, respectively.

However, when the solution of hydroxylated silicone resin with hydroxyl groups bound to silicon atoms is mixed with either an aminoalkylalkoxysilane or alkenylacetoxysilane, crosslinking occurs within a short time period and the storage stability is poor. In order to overcome such a drawback, there is a rigid requirement that these components should be mixed immediately before use. In such a case, the working time of the resin is very poor. The coating resin obtained by curing these hydroxylated silicone resins at room temperature, according to prior methods, have poor solvent resistance and they readily swell in solvents such as xylene and acetone.

Certain other methods were tried to overcome the drawbacks of the previously discussed prior art resins such as mixing alkoxysilanes and aminoalkylalkoxysilanes at a certain ratio with a hydroxylated silicone resin as reported in Japanese Pat. No. Sho 53[1978]-13,503.

Although the cured coating prepared from the composition set forth in Japanese Pat. No. Sho 53[1978]-13,503 does not swell in solvents such as xylene and acetone, it has some drawbacks, in that, the coating dissolves or peels off within 30 minutes after the coating is exposed to severe conditions, for example, immersion in 1,1,1-trichloroethane at 40°-50° C. and irradiation with ultrasonic waves and, in addition, the mold release property of the coating surface is poor.

The instant invention overcomes these problems. It was found that when an alkoxy-containing organopolysiloxane is compounded with the above-mentioned composition, a cured coating which has excellent storage stability and excellent solvent resistance and weather resistance, can be formed.

This invention therefore consists of a silicone resin composition comprising (A) 100 parts by weight of a hydroxylated organopolysiloxane of the general formula

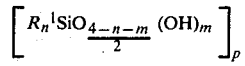

wherein $R^1$ is a substituted or unsubstituted monovalent hydrocarbon radical, n has an average value of from 0.80 to 1.80, p is an integer equal to or greater than 3, m has a value such that the total hydroxyl content of the organopolysiloxane is equal to or greater than 0.01 weight percent; (b) 0.5–150 parts by weight, per 100 parts of (A), of an alkoxylated organopolysiloxane of the general formula

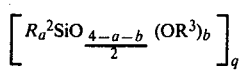

wherein $R^2$ has the same meaning as $R^1$, $R^3$ is a substituted or unsubstituted alkyl radical having 1–6 carbon atoms, a has an average value of from 0.40 to 1.70 q is an integer equal to or greater than 3, b has a value such that the total alkoxy content in (B) is equal to or greater than 5 weight percent; (C) 1–150 parts by weight, per 100 parts of (A), of an alkoxysilane of the general formula

wherein $R^4$ has the same meaning as $R^1$, $R^5$ has the same meaning as $R^3$, c has a value of 0.1 to 2 and, (D) 0.1–20 parts by weight, per 100 parts of (A) of an aminoalkylalkoysilane of the general formula

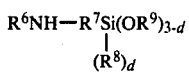

wherein $R^6$ is selected from a group consisting of the hydrogen atom, alkyl groups of 1–6 carbon atoms and aminoalkyl groups, $R^7$ is a divalent hydrocarbon radical, $R^8$ and $R^9$ are alkyl groups of 1–6 carbon atoms, and d has a value of 0 or 1.

Component (A), the hydroxylated organopolysiloxane, can be any conventional organopolysiloxane resin. These materials are prepared generally by co-hydrolyzing chlorosilanes by conventional techniques.

For example, component (A) can be obtained by the hydrolysis of one or a mixture of two or more chlorosilanes having 0.8–1.8 organic radicals per silicon atoms in the presence of an organic solvent. Both an organopolysiloxane resin not subjected to any treatments after the hydrolysis and an organopolysiloxane resin in which a portion of the silanol groups have been caused to undergo condensation by heat treatment can be used in this invention. The amount of hydroxyl in the organopolysiloxane resin molecule must be equal to or greater than 0.01 wt%.

Examples of monovalent hydrocarbon radicals bound to the silicon atom are alkyl groups such as methyl, ethyl, propyl, tert-butyl, 2-ethylhexyl, dodecyl, 1-isobutyl-3,5-dimethylhexyl and octadecyl groups, alkenyl groups such as vinyl, allyl, and hexadienyl groups, cycloalkyl groups such as cyclopentenyl, cyclohexenyl, and cyclo-2,4-hexadienyl, aryl groups such as phenyl and naphthyl groups, aralkyl groups such as benzyl, phenylethyl and xylyl groups, alkaryl groups such as tolyl and dimethylphenyl groups, and halogenated monovalent hydrocarbon radicals such as chloromethyl, 3,3,3-trifluoropropyl, 3,3,4,4,5,5,5-heptafluoropentyl, perchlorophenyl, 3,4-dibromocyclohexyl, 2,2,2-trifluorotolyl, 2,4-dibromobenzyl, difluoromonochlorovinyl, $\alpha,\beta,\beta$-trifluoro-$\alpha$-chlorocyclobutyl and 2-iodocyclobutyl groups.

In order to obtain good mold release properties and water repellency on the coating surface, it is important to avoid the presence of more than 0.5 aryl groups bound to silicon atoms per silicon atom in the hydroxylated organopolysiloxane resin.

Component (B), the alkoxylated organopolysiloxane used in the present invention, can be obtained by the condensation of corresponding alkoxysilanes in the presence of an acid or alkali catalyst. In the condensation, the cocondensation of tetraalkylsilicates and titanate esters is contemplated by the invention. The amount of alkoxy groups bound to silicon atoms in the molecule must be equal to or greater than 5 wt% in the component (B). If there is less than the above-mentioned amount, a satisfactory solvent resistance cannot be obtained. The number of monovalent hydrocarbon radicals bound to the silicon atom must be 0.40 to 1.70 per silicon atom, and preferably 0.50 to 1.20.

The monovalent hydrocarbon radicals bound to the silicon atoms of the alkoxylated organopolysiloxane are those set forth above for component (A). The $R^3$ group which forms the alkoxy group can be a substituted or unsubstituted alkyl group such as methyl, ethyl, propyl, tert-butyl, methoxyethyl, chloroethyl, $\alpha$-ethylhexyl, dodecyl, 1-isobutyl-3,5-dimethylhexyl and octadecyl groups.

The amount of alkoxylated organopolysiloxane resin (B) ranges from 0.5 to 150 parts by weight per 100 parts by weight of component (A), and preferably from 1 to 70 parts by weight. If the amount is less than 0.5 part by weight, the solvent resistance of the coating is insufficient. If it exceeds 150 parts by weight, the coating becomes brittle.

Component (C), the alkoxysilane of the present invention, can be for example: methyltrimethoxysilane, methyltriethoxysilane, ethyltrimethoxysilane, propyltrimethoxysilane, methyltri(methoxyethoxy)silane, dimethyldimethoxysilane, diethyldiethoxysilane, dipropyldimethoxysilane, methylethyldimethoxysilane, ethylpropyldimethoxysilane, propylmethyldimethoxysilane, dimethyldi(methoxyethoxy)silane, vinyltrimethoxysilane, vinylmethyldimethoxysilane, vinylethyldimethoxysilane, vinylethyldi(methoxyethoxy)silane, vinylpropyldimethoxysilane, allyltrimethoxysilane, allyltriethylsilane, 3,3,3-trifluoropropyltrimethoxysilane, 3,3,3-trifluoropropylmethyl-dimethoxysilane, methyl orthosilicate, ethyl orthosilicate, propyl orthosilicate and hexyl orthosilicate.

The amount of alkoxysilane used in this invention generally ranges from 1 to 150 parts by weight per 100 parts by weight of component (A) and preferably from 5 to 80 parts by weight. If the amount is less than 1 part by weight, the storage stability of the composition is poor and the solvent resistance of cured coating is also poor. If it exceeds 150 parts by weight, the good storage stability is retained, but the drying properties, when it is applied as a coating, are poor.

Component (D), the aminoalkylalkoxysilane used in the present invention can be for example: γ-aminopropyltrimethoxysilane, γ-aminopropyltriethoxysilane, γ-(aminoethyl)-aminopropyltrimethoxysilane, methyl-γ-aminopropyldimethoxysilane, methyl-γ-(aminoethyl)-aminopropyldimethoxysilane and γ-dimethylaminopropyltrimethoxysilane.

The amount of aminoalkylalkoxysilane present in this invention preferably ranges from 0.1 to 20 parts by weight per 100 parts by weight of component (A). If the amount is less than 0.1 parts by weight, it takes a long time for curing and the adhesion of the cured coating with the base material is poor. If it exceeds 20 parts by weight, the cured coating discolors, especially at high temperatures.

Organic solvents may be used in the present invention. They are not always needed if both components (A) and (B) have relatively low molecular weights. The application of the organic solvents is generally preferred because of the fact that component (A) is preferably diluted with the organic solvents before use. Also, the workability of the coated films is enhanced.

Aromatic, aliphatic and chlorine-containing solvents can be used as the organic solvents. Examples of aromatic organic solvents are benzene, toluene, xylene, trimethylbenzene, tetramethylbenzene and ethylbenzene. Examples of aliphatic organic solvents are hexane, gasoline for industrial use, cyclohexane, methylcyclohexane and dimethylcyclohexane. Examples of chlorine-containing solvents are trichloroethylene, 1,1,1-trichloroethane, carbon tetrachloride and chloroform. Especially useful are the aromatic solvents such as xylene, toluene and benzene, which have a high solvation effect with respect to component (A).

In addition to the above-mentioned components (A)–(D), if desirable, $\alpha,\omega$-dihydroxydiorganopolysiloxane can be added in order to improve the mold release property. In such a case, the mold release property is improved as the amount of addition of $\alpha,\omega$-dihydroxydiorganopolysiloxane increases. On the other hand, the cured coat tends to become softer. Thus, the amount of this siloxane preferably ranges from 0.1 to 30 wt% per 100 parts by weight of component (A), if used. A catalyst can also be used in these compositions for the purpose of acceleration of the curing reaction. Appropriate catalysts are those which are ordinarily used in the dehydration condensation of silanol groups. Examples of such catalysts are the tin salts of carboxylic acids: dibutyltin diacetate, dibutyltin dilaurate, dibutyltin dioctoate, stannous octoate, stannous naphthenate, stannous oleate, stannous isobutylrate, stannous linoleate, stannous stearate, stannous benzoate, stannous naphthoate, stannous laurate, stannous O-thymate, stannous β-benzoylpropionate, stannous crotonate, stannous tropate, stannous p-bromobenzoate, stannous palmitooleate, stannous cinnamate and stannous phenyl acetate. In addition, a variety of pigments which are used in the common paints can be added.

The silicone resin compositions of this invention are characterized by the fact that they can form a hard coating by rapid curing at room temperature. The cured coating has excellent solvent resistance, mold release properties, water repellency, heat resistance and weather resistance. Thus, such compositions can be utilized in a wide range of applications. Examples of expected applications are coating agents for the purposes of release of oil, snow, ice, paints, dirt, foods, adhesives, tackifiers, mud, dust, raw rubber and latex; improvement of peelability and mold release; coating agents for the purposes of protection of the surface of various substances from the action of light, air, water, corrosive gases, corrosive liquids such as acids and alkalis, and various solvents; coating agents for the purpose of improvement in the surface electrical characteristics, especially the electrical insulation properties of various substances; and coating agents for the purpose of reducing the liquid viscosity resistance acting on an interface in contact with a liquid.

Almost any type of substrate can be coated. Examples of such substrates are: metals, plastics, ceramics, glass, wood, rubber, mortar, concrete, brick, tiles and slate. Specific examples of such applications are automobiles, ships, metal dies, cooking utensils, food containers, electric poles, guard rails, road signs, relays, terminals, insulators, spark plugs, printed base plates, electric contacts, electric wires, interior or exterior surfaces of pipes used for carrying liquids, bridge beams, buildings, tile joints, various types of apparatii and their parts, engines, mudguards, window glasses and the prevention of water leakage from reservoirs.

The present invention will be explained in the following examples, but the present invention should not be considered as being restricted by these examples.

Unless otherwise specified, "parts" and "%" refer to "parts by weight" and "weight%," respectively. The properties determined in the following examples were measured using a test panel prepared by curing at room temperature after the silicone resin was coated on a soft steel plate $50 \times 100 \times 0.5$ mm with a certain thickness, according to the test methods described below:

Adhesion test

A grid of 100 squares 1 mm on each side were cut in a 1 cm$^2$ area of the coating. A cellophane tape was applied over the squares and then peeled off. The adhesiveness was expressed as the number of squares remaining out of 100 squares.

Spot test

A solvent was dripped on the coating using a micropipet. The solvent was wiped off with a piece of gauze after one hour. The changes in the appearance of the coating were observed macroscopically.

Rubbing test

A piece of gauze wet with a solvent was moved back and forth over the surface under a load of 700 grams. The test result was expressed as the number of cycles until the coat was broken and the gauze came in contact with the base material.

Ultrasonic washing test 1,1,1-trichloroethane was placed in an Ultrasonic Cleaner produced by Sharp Corp. (UTB-852, electric source 100 V, output 150 W, frequency 28 kHz) and the test panel was immersed in the bath. After the test panel was washed with ultrasonic waves for 10 minutes, the changes in the appearance of coat were observed macroscopically.

Heat resistance test

After heating at 250° C. for 24 hours, the changes in the appearance, i.e. blisters, swelling, discoloration and cracks, were observed macroscopically.

Mold releasing property test

A coat of white baking type acrylic resin [Cortrax TM SA-107 manufactured by Toray Industries, Tokyo (50%) 42 parts, Super Beckamine TM G-821 manufactured by Dainippon Ink and Chemicals, Tokyo (50%) 12 parts, Araldite TM #6071 manufactured by Nippon Chiba Geigy, Osaka (50%) 6 parts, titanium oxide 30 parts, and xylene 12 parts] was applied on the coat of silicone resin. The coat was baked at 150° C. for 30 minutes and the peeling status of the acrylic resin coat was examined using an adhesive tape.

Storage stability test

Silicone resin composition was left standing in a closed container at room temperature and the status of gel formation was examined.

EXAMPLE 1

$(CH_3)_2SiCl_2$ (40 mol%) and $CH_3SiCl_3$ (60 mol%) were hydrolyzed together in toluene to obtain a 50% toluene solution of hydroxylated organopolysiloxane resin in which the content of hydroxyl groups was 0.9%. This is Component (A).

Subsequently, $CH_3Si(OCH_3)_3$ was subjected to condensation polymerization using an acid catalyst in the presence of water. This alkoxylated organopolysiloxane resin contained 35% methoxy groups and its viscosity at 25° C. was 70 cs. This is Component (B).

Using the above-mentioned organopolysiloxane resins, the silicone resin compositions were prepared with the compounding ratios shown in Table I.

Each of the four types of silicone resin compositions prepared in Examples No. 1 and No. 2, the Comparison Examples No. 1 and No. 2 were coated to obtain a constant thickness on a soft steel plate $50 \times 100 \times 0.5$ mm. The coat was cured at room temperature for 48 hours. The cured coat was examined with respect to the various tests mentioned above. The results obtained are shown in Table II.

In the cases of Example No. 1 and No. 2, the coat was found to demonstrate excellent solvent resistance and mold release property.

EXAMPLE 2

A 50% xylene solution of hydroxylated organopolysilane resin with 0.5% hydroxyl groups bound to silicon and with 1.4 organic radicals per silicon atom (the organic radicals had a phenyl group/methyl group mol ratio of 0.1) was used. This resin (100 parts as a resin component) was combined with the alkoxylated organopolysiloxane, (30 parts) used in Example 1, methyltrimethoxysilane (15 parts), $\gamma$-(aminoethyl)-aminopropyltrimethoxysilane (5 parts) and dibutyltin diacetate (0.5 parts) as a catalyst and the mixture was blended until homogeneous. The resulting composition was coated with a constant thickness on the soft steel plate $50 \times 100 \times 0.5$ mm and the coating was cured at room temperature for 48 hours. The cured coating (Example No. 3) was examined with respect to the solvent resistance and mold release properties.

As a comparison, a composition was prepared excluding the alkoxylated organopolysiloxane from the above-mentioned composition (Comparison Example No. 3) and the cured coating was examined by the same tests.

The results are presented in Table III. The solvent resistance and the mold release properties were superior in the case of Example No. 3.

EXAMPLE 3

The silicone resin composition of Example 1 (100 parts) was diluted with gasoline for industrial use (400 parts) and the mixture was sprayed on a painted portion of an automobile. The coated surface felt dry to the touch in five minutes after being sprayed. The pencil hardness was H after 24 hours and reached 2 H after 2 weeks. The thickness of the coat was 5μ. The coated surface exhibited excellent gloss and excellent water repellency. When the coated surface was washed with water, water dripped naturally from the inclined surface of the body, and water droplets that stayed on the horizontal furfaces were easily wiped off with a rubber spatula and the surface was in a completely dry moisture-free state. The small amounts of sand and dust accumulated on the body were trapped in the water droplets due to the action of surface tension of water, and were removed with the water droplets sliding down the body surface.

In addition, the dirt resulting from splashes of mud when driving in rain was minimal and was removed easily by washing with water.

Bird droppings that adhered on the body were easily removed by rinsing with water and wiping the surface with a rubber spatula. In addition, the adhesion of asphalt was minimal when driving on the road immediately after it had been paved with asphalt. The adhered asphalt was easily removed.

Little change occurred in the water repellency and gloss of the coating even after 6 months. Washing with water was adequate for cleaning. A portion with heavy dirt, where the water repellency was lost, recovered excellent water repellency when the surface was washed with soapy water.

The application of car wax was not needed during the test period. The water repellency and dirt resistance were better than when car wax was used. Since the labor required to apply the car wax was saved, the labor for maintaining the beauty of the car was reduced considerably.

TABLE 1

| Silicone resin composition | Examples No. 1 | Examples No. 2 | Comparison Examples No. 1 | Comparison Examples No. 2 |
|---|---|---|---|---|
| Hydroxylated organopolysiloxane resin (parts) | 54 | 54 | 54 | 54 |
| Alkoxylated organopolysiloxane resin (parts) | 13 | 32 | 0 | 13 |
| CH$_3$Si(OCH$_3$)$_3$ | 7.6 | 7.6 | 7.6 | 0 |
| H$_2$N(CH$_2$)$_2$NH(CH$_2$)$_3$Si(OCH$_3$)$_3$ (parts) | 2.6 | 2.6 | 2.6 | 2.6 |
| Dibutyltin diacetate (parts) | 0.4 | 0.4 | 0.4 | 0.4 |

TABLE II

| Test | Example No. 1 | Example No. 2 | Comparison Example No. 1 | Comparison Example No. 2 |
|---|---|---|---|---|
| Pencil hardness | 2H | 2H | F | H B |
| Adhesiveness | 100/100 | 100/100 | 100/100 | 100/100 |
| Solvent resistance- | | | | |
| Spot test (xylene) | Abnormalities | Excellent | Abnormalities | Abnormalities |
| Spot test (acetone) | " | " | " | " |
| Rubbing test (xylene) | 100 | 120 | 15 | 10 |
| Ultrasonic washing test (1,1,1-trichloroethylene) | Abnormalities | Abnormalities | Swelled and peeled | Swelled and peeled |
| Heat resistance | Excellent | Excellent | Excellent | Excellent |
| Mold release property | Peeled easily | Peeled easily | Adhered | Adhered |
| Storage stability | Stable after 6 months | Stable after 6 months | Stable after 6 months | Gelled within 48 hours |

TABLE III

| Test | Example No. 3 | Comparison Example No. 3 |
|---|---|---|
| Solvent resistance- | | |
| Spot test (xylene) | Abnormalities | Abnormalities |
| Spot test (acetone) | " | " |
| Rubbing test (xylene) | 115 | 20 |
| Ultrasonic washing test | Abnormalities | Swelled and peeled |
| Mold release property | Peeled | Adhered |

That which is claimed is:

1. A silicone resin composition comprising
(A) 100 parts by weight of a hydroxylated organopolysiloxane of the general formula

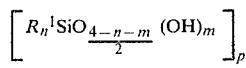

wherein R$^1$ is a substituted or unsubstituted monovalent hydrocarbon radical, n has an average value of from 0.80 to 1.80, p is an integer equal to or greater than 3, m has a value such that the total hydroxyl content of the organopolysiloxane is equal to or greater than 0.01 weight percent;
(B) 0.5–150 parts by weight, per 100 parts of (A), of an alkoxylated organopolysiloxane of the general formula

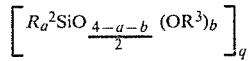

wherein R$^2$ has the same meaning as R$^1$, R$^3$ is a substituted or unsubstituted alkyl radical having 1–6 carbon atoms, a has an average value of from 0.40 to 1.70, g is an integer equal to or greater than 3, b has a value such that the total alkoxy content in (B) is equal to or greater than 5 weight percent;
(C) 1–150 parts by weight, per 100 parts of (A), of an alkoxysilane of the general formula

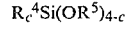

wherein R$^4$ has the same meaning as R$^1$, R$^5$ has the same meaning as R$^3$, c has a value of 0.1 to 2 and,
(D) 0.1–20 parts by weight, per 100 parts of (A) of an aminoalkylalkoxysilane of the general formula

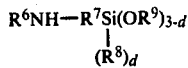

wherein $R^6$ is selected from a group consisting of the hydrogen atom, alkyl groups of 1-6 carbon atoms and aminoalkyl groups, $R^7$ is a divalent hydrocarbon radical, $R^8$ and $R^9$ are alkyl groups of 1-6 carbon atoms, and d has a value of 0 or 1.

2. A silicone resin composition as claimed in claim 1 wherein there is present 100 parts of (A);

1 to 70 parts of (B);

5 to 80 parts of (C) and, 0.1 to 20 parts of (D) wherein the amounts of (B), (C) and (D) are based on 100 parts of (A).

3. The composition claimed in claim 1 which also contains an organic solvent.

4. The composition claimed in claim 1 which also contains a curing catalyst for the composition.

5. The composition claimed in claim 3 which also contains a curing catalyst for the composition.

6. The composition as claimed in claim 2 wherein (A) consists of 40 mol percent $(CH_3)_2SiO$ units and 60 mol percent $CH_3SiO_{3/2}$ units with a hydroxyl content of 0.9 weight percent; (B) consists of an alkoxylated organopolysiloxane having a viscosity at 25° C. of 0.070 pa·s and an alkoxy content of 35 weight percent; (C) is $CH_3Si(OCH_3)_3$ and (D) is $(CH_3O)_3Si(CH_2)_2NH(CH_2)_2NH_2$.

7. The composition as claimed in claim 6 wherein (A) is present in an amount of 54 parts; (B) is present in an amount of 13 parts; (C) is present in an amount of 7.6 parts and (D) is present in an amount of 2.6 parts.

8. The composition as claimed in claim 7 wherein there is also present 0.4 parts of a catalyst.

9. The composition as claimed in claim 8 wherein the catalyst is dibutyltin diacetate.

* * * * *

UNITED STATES PATENT AND TRADEMARK OFFICE
CERTIFICATE OF CORRECTION

PATENT NO. : 4,267,297
DATED : May 12, 1981
INVENTOR(S) : Tsuneo Hanada; Ryuzo Mikami It is certified that error appears in the above-identified patent and that said Letters Patent are hereby corrected as shown below:

In Column 2, line 32; "ylalkoysilane" should read "ylalkoxysilane".

In Column 2, line 49; the word "atoms" should read "atom".

In Column 7, line 7; the word "furfaces" should read "surfaces".

In Column 8, line 38; the line "to 1.70, g is an interger equal to or greater than 3, b" should read "to 1.70, q is an interger equal to or greater than 3, b".

Signed and Sealed this

Twenty-fifth Day of August 1981

[SEAL]

Attest:

GERALD J. MOSSINGHOFF

Attesting Officer

Commissioner of Patents and Trademarks